United States Patent
Staring et al.

(10) Patent No.: US 11,139,859 B2
(45) Date of Patent: Oct. 5, 2021

(54) WIRELESS INDUCTIVE POWER TRANSFER

(71) Applicant: KONINKLIJKE PHILIPS N.V., Eindhoven (NL)

(72) Inventors: Antonius Adriaan Maria Staring, Eindhoven (NL); Andries Van Wageningen, Wijlre (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 16/841,950

(22) Filed: Apr. 7, 2020

(65) Prior Publication Data
US 2020/0274581 A1    Aug. 27, 2020

Related U.S. Application Data

(63) Continuation of application No. 14/441,308, filed as application No. PCT/EP2013/074784 on Nov. 26, 2013, now Pat. No. 10,771,112.

(30) Foreign Application Priority Data

Nov. 29, 2012 (EP) .................................... 12194763

(51) Int. Cl.
*H04B 5/00* (2006.01)
*H02J 50/12* (2016.01)
*H02J 50/80* (2016.01)

(52) U.S. Cl.
CPC ............ *H04B 5/0037* (2013.01); *H02J 50/12* (2016.02); *H02J 50/80* (2016.02); *H04B 5/0031* (2013.01); *H04B 5/0081* (2013.01)

(58) Field of Classification Search
CPC .. H04B 5/0037; H04B 5/0031; H04B 5/0081; H02J 7/025; H02J 50/80; H02J 50/12; H02J 5/005
See application file for complete search history.

(56) References Cited

U.S. PATENT DOCUMENTS

2010/0146308 A1    6/2010    Gioscia et al.
2010/0171461 A1    7/2010    Baarman et al.

FOREIGN PATENT DOCUMENTS

JP    2010183704 A    8/2010
WO    2012049582 A1    4/2012
(Continued)

OTHER PUBLICATIONS

"System Description Wirelss Power Transfer", vol. 1: Low Power, Part 1: Interface Definition, Version1.0, Jul. 2010, pp. 1-83.
(Continued)

*Primary Examiner* — Jung Kim

(57) ABSTRACT

A power transmitter (101) is arranged to transfer power to a power receiver (105) using a wireless inductive power signal. The power transmitter (101) comprises a power signal generator (207) which drives an inductor (103) to provide the power signal to an inductor of the power receiver (105). A power loop control is employed by the power receiver (105) providing power control error messages to the power transmitter (101). The power transmitter (101) comprises a query message processor (209) which can detect a query message received from the power receiver (105) using load modulation of the power signal. A modification processor (211) is arranged to modify a response of the power loop controller to the power control error messages dependent on the query message. The power receiver (105) can detect the modifications to the operation of the power control and thus can interpret this as a response to the query message.

20 Claims, 5 Drawing Sheets

(56) References Cited

FOREIGN PATENT DOCUMENTS

| WO | 2012129273 A1 | 9/2012 |
| WO | 2013046104 A2 | 4/2013 |
| WO | 2014001983 A1 | 1/2014 |

OTHER PUBLICATIONS

Van Wageningen et al, "The QI Wirelss Power Standard", Power Electronics and Motion Control Conference, XP031778417, Sep. 6, 2010, pp. S15-S25.
Pellitteri et al, "Improving the Efficiency of a Standard Compliant Wireless Battery Charge", Universities Power Engineering Conference, Sep. 4, 2012, XP032291266, pp. 1-6.
"Wireless Power Consortium", Downloaded From http://www.wirelesspowerconsortium.com/index.html, Apr. 22, 2015, pp. 1-7.

WIRELESS INDUCTIVE POWER TRANSFER

CROSS-REFERENCE TO PRIOR APPLICATIONS

This application is a continuation of U.S. application Ser. No. 14/441,308 filed May 7, 2015 which is the U.S. National Phase application under 35 U.S.C. § 371 of International Application No. PCT/EP2013/074784, filed on Nov. 26, 2013, which claims the benefit of European Patent Application No. 12194763.4, filed on Nov. 29, 2012. These applications are hereby incorporated by reference herein.

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless Power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 of the Qi wireless power specification (version 1.0).

System Control

In order to control the wireless power transfer system, the Qi standard specifies a number of phases or modes that the system may be in at different times of the operation. More details can be found in chapter 5 of part 1 of the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition, the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

The system allows for an efficient setup and operation of the power transfer. However, the approach is restrictive and may not allow the full desired flexibility and support for functions as required. For example if a power receiver tries to get more than 5 W power from a power transmitter the power transmitter may terminate power transfer resulting in a bad user experience. Therefore, it is desirably to further develop the Qi standard to provide enhanced functionality, flexibility and performance. However, such a development of the standard must be made very carefully and must for example ensure that backwards compatibility is maintained in order to allow existing products to remain useful.

As an example of challenges when further developing the Qi standards is that of how to support the desired interaction between power transmitters and power receivers. In order to provide future upgradability and flexibility, the Qi standard version 1.0 defined a number of messages which could be communicated from the power receiver to the power transmitter but which were reserved for future use, i.e. no specific meaning was attached to the defined messages in version 1.0.

However, rather than ignore such messages, it has been found that a number of power transmitters that have been manufactured respond to receiving such messages by aborting any ongoing power transfer. However, if such a power transmitter is used with a power receiver that adheres to a later version of the standard using these reserved messages, the power transfer will be terminated. Thus, existing power transmitters cannot be used with future power receivers using the reserved extension messages. Accordingly, the further developments of the standard cannot readily utilize the reserved messages.

The current Qi standard utilizes only a unidirectional communication link and only supports communication of information from the power receiver to the power transmitter. However, it has been proposed to also introduce communication from the power transmitter to the power receiver.

An example of a system allowing communication from a power transmitter to a power receiver is provided in WO2012/049582. In the system, a power receiver may transmit a message to a power transmitter, and the power transmitter may respond to the message by amplitude or frequency modulating the power signal provided to the power receiver. In the disclosed system, during the configuration phase, the facts that the power receiver does not provide power to a load and that the power is constant are used by the power transmitter to communicate a response to a message. Specifically, a control message may be sent from the power transmitter to the power receiver and the power transmitter may proceed to provide a binary response to the power receiver by either introducing a power level change or not to the power signal.

However, although WO2012/049582 may allow some communication from the power transmitter to the power receiver, it may not be optimal in all scenarios. For example, the added amplitude or frequency modulation may be an undesirable modification to the power signal in some situations. Also, the approach is based on characteristics only present during initialization and prior to the power transfer, and this may restrict the use in many practical scenarios.

In general, the introduction of a bidirectional link is not trivial and is subject to a large number of difficulties and challenges. For example, the resulting system still needs to be backwards compatible and e.g. power transmitters and receivers that are not capable of bidirectional communication still need to be supported. Furthermore, the technical restrictions in terms of e.g. modulation options, power variations, transmission options etc. are very restrictive as they need to fit in with the existing parameters and with regulatory requirements. Indeed, in some areas regulatory requirements do not allow direct modulation of the power signal. Although this may be addressed by using a separate communication link, such as e.g. a Bluetooth communication link, this adds complexity and cost to the implementation.

It is also important that the communication from the power transmitter to the power receiver does not impact, degrade or interfere with the communication from the power receiver to the power transmitter. Furthermore, an all-important requirement is that the communication link does not unacceptably degrade the power transferability of the system.

Accordingly, many challenges and difficulties are associated with enhancing a power transfer system such as Qi to include bidirectional communication. Thus, the introduction of bidirectional communication in power transfer systems, such as Qi systems, is complicated and subject to many restrictions and requirements in order to ensure both efficient power transfer, efficient operation and not least backwards compatibility.

Hence, an improved power transfer system would be advantageous and in particular a system allowing increased flexibility, improved backwards compatibility, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a power transmitter for transferring power to a power receiver using a wireless inductive power signal, the power transmitter comprising: an inductor for providing the power signal; a power signal generator for driving the inductor to provide the power signal; a receiver for receiving data messages from the power receiver, the data messages being communicated by load modulation of the power signal; a power loop controller arranged to control a power of the power signal in response to power control error messages received from the power receiver; a query message processor for detecting that a query message has been received from the power receiver; and a modification processor for modifying a response of the power loop controller to power control error messages in response to the query message.

The invention may provide an improved power transfer system. It may in many embodiments allow, support or facilitate further extension and development of a power transfer system by introducing bidirectional communication. This may in many scenarios be achieved while maintaining backwards compatibility. The invention may allow a practical approach and may facilitate introduction into existing systems. Furthermore, the approach achieves the bidirectional communication using the power transfer signal but without overlaying the power signal with additional modulation or increased power signal variations and fluctuations.

The approach may specifically allow data to be communicated from the power transmitter to the power receiver without requiring introduction of additional modulation of the power signal. Rather, the existing power control loop may temporarily be interrupted and the functionality may be used to provide information to the power receiver. The approach may be implemented with relatively low additional complexity.

The approach may in particular provide for communication from a power transmitter to a power receiver which reduces impact on other functionality. In particular, the approach may reduce the impact of the communication on the power signal. As such, the impact of introducing bidirectional communication may be reduced for both the power transfer operation and the power receiver to power transmitter communication. This may in particular facilitate operation and implementation, as well as improve backwards compatibility. In particular, introduction of bidirectional communication to existing power transfer systems previously supporting only unidirectional communication may be facilitated. The approach may in many embodiments allow reuse of existing hardware for power transmitters and power receivers, and may require only a small change in the firmware, and a marginal change in the complexity.

A particular advantage of the approach is that it may in many embodiments reduce the impact of data communication on the power signal. The power signal may be less affected by the additional data communication and thus may interfere less with the power transfer operation. This may in particular be significant for backwards compatibility as legacy equipment may not be affected by the introduction of the data communication that the equipment has not been designed for. In many embodiments, the deviations of the power signal due to the introduced data communication may be maintained to a sufficiently low level for it not to impact the power transfer characteristics for the system. Indeed, in many scenarios, the effects of the data communication may be kept to a level where they are imperceptible or negligible for the power transfer phase functionality (e.g. of legacy equipment). Specifically, the bidirectional communication may be introduced while maintaining the characteristics of the power signal within the limits that could occur during operation without any bidirectional communication, and specifically in many embodiments within the limits of a conventional legacy power control.

Furthermore, the approach may fit well with the design principles and philosophies of many existing power transfer systems. For example, the approach follows the design principles and philosophies of the Qi power transfer system.

The approach may for example be used to extend and enhance existing power transfer standards, such as for example the Qi standard. For example, the query message may request an indication of whether the power transmitter can support use of the reserved messages of the Qi standard version 1.0. If so, the power transmitter may temporarily change the response to the power control error messages thereby providing an indication to the power receiver, that it may use the reserved messages. Thus, it can be ensured that the reserved messages will only be used with power transmitters that are capable of interpreting the messages and will not be sent to legacy power transmitters which may terminate a power transfer operation in response to receiving a reserved message.

The power loop controller is arranged to implement a (closed) power control loop to control a power of the power signal in response to power control error messages received from the power receiver. The power control error messages may comprise requests from the power receiver to modify the power of the power signal. The modification processor may modify the operation of a closed power control loop by modifying a response of the power loop controller to power control error messages. The modification processor may transmit a response message to the query message to the power receiver by modifying the response of the power loop controller to power control error messages, i.e. by modifying the operation of the power control loop.

The information (data) communicated to the power receiver is communicated by a modification in the response of the power loop controller to power control error messages, i.e. in the modification in the operation of the (closed) power control loop rather than by direct modulation of the power signal.

In many embodiments, the modification in the responses to power control error messages may be predetermined for given messages to the power receiver, but the resulting impact on the power signal will not be predetermined, at least for one of the given messages. I.e. in many embodiments, the variation of the power signal resulting from the communication will for at least one message out of the possible messages that may be communicated be dependent on the power control error messages received (and thus not only be dependent on the message which is communicated).

The closed power control loop may specifically involve the power receiver evaluating if the power of the power signal has a desired level. The desired level may be a relative level and may vary dynamically. Specifically, the desired level may be a level which is sufficient to provide the required power to the load. The power control error messages may comprise requests for power changes to the power of the power signal, and specifically requests to change the power of the power signal towards the desired level. The power control error messages may comprise requests to increase, reduce or keep constant the current power level (or e.g. only to increase or reduce the power level). The power loop controller may operate a closed loop power control loop by modifying the power signal as requested by the power control error messages (when the modification processor does not introduce any modification, i.e. when a response to the query message is not communicated to the power receiver). The closed loop power control may accordingly allow the power receiver to control the power of the power signal. This allows the power signal to be continuously adapted to the current conditions, including adaptation to dynamic power variations.

The power loop controller may iteratively/repeatedly adapt the power signal to the (requests of) power control error messages. Power control error messages may be received repeatedly and continuously during e.g. a power transfer phase, e.g. with a maximum predetermined time interval between power control error messages (e.g with at most 250 msec between consecutive power control error messages).

The power loop controller is accordingly arranged to dynamically vary the power of the power signal in response to repeated power control error messages. The power level of the power signal may accordingly be controlled and given by the power control error messages and is accordingly dynamically variable. E.g. The power loop controller may be operable to/capable of operating the power control loop such that the power signal may vary by at least a factor of two (e.g. the maximum possible power may be at least twice the minimum possible power) in response to power control error messages. The modification processor may temporarily modify the response of the power loop controller to power control error messages. For example, the response may be modified for a given number of power control error messages.

The power loop controller may operate in different modes including a nominal power control loop mode wherein the power of the power signal is modified as requested by the power control error messages. It may then temporarily switch to a second mode, in which the response to the power control error messages differs from the response to the power control error messages in the nominal power control mode. The switch between the nominal and the second mode is in response to the query message. E.g., a binary response to the query message may be provided by the modification processor switching or not switching to the second mode of operation. In some embodiments, the power loop controller may be capable of further operating in a third, fourth, etc. mode, with each mode having a different response to power control error messages. The modification processor may be arranged to switch the power loop controller between the plurality of power control loop modes in response to the query message. The response message to the query message may thus be communicated by the modification processor temporarily selecting one power control mode from the possible power control modes. The use of more than two possible power control modes allows more than a binary value to be provided for each (possible) change of power control modes.

The modification processor may modify the response to at least one power control error message such that the requested power change is not provided. For example, a power change of a different magnitude than requested may be applied to the power signal, and specifically a different sign of the power change may be used. The modification of the response may provide an indication of a reply to the query message. Thus, by detecting whether the power transmitter responds to the power control error messages as expected for normal power control operation or whether the power transmitter responds in a modified way, the power receiver can determine a reply to the query message. Specifically, the power transmitter may for example maintain normal power control operation, if the query message comprises a request that cannot be affirmed but may change power control operation to acknowledge and affirm the request. Such an approach may provide backwards compatibility as a legacy power transmitter may ignore, not understand, or even not detect the query message and therefore proceed with a normal power control operation. However, a power transmitter compatible with newer versions of the standard, may be equipped with functionality for detecting the query message and for changing power control operation to confirm that it has this capability. The power receiver can detect a modified response to the power control error messages and will accordingly be aware that the power transmitter is compatible with a newer version. The power transmitter and power receiver may then proceed to utilize the enhanced functionality of the newer versions of the standard.

The modification of the response to a power control error message may be to provide a different power change to the power signal in response to the power control error message than during non-modified power control loop operation, and specifically to provide a different power change to the power signal than requested or indicated by the power control error message. The modified power change will typically have a value that does not exceed the requested/non-modified power change. This may reduce the variations to the power signal.

The modifications to the response to power control error messages may specifically be during a power transfer phase.

In accordance with an optional feature of the invention, the modification processor is arranged to ignore at least one error control message in response to the query message.

This may in many embodiments provide a particularly advantageous way for the power transmitter to provide a response to a query message from the power receiver. It may allow effective, reliable and/or low complexity detection at the power receiver. A particular advantage may be that power variations to the power signal may be reduced or even minimized.

The modification processor may ignore the control error message by not introducing any power change to the power signal in response to the power control error message.

The modification processor may specifically be arranged to confirm, accept or acknowledge a request from the power receiver provided in the query message by ignoring at least one power control error message, and may reject the request by continuing to amend the power of the power signal in response to the power control error messages.

In accordance with an optional feature of the invention, the power control error messages indicate a request for a power change of the power signal, and the modification processor is arranged to modify a response for at least one power control error message by changing a power of the power signal in an opposite direction to that requested by the at least one power control error message.

This may in many embodiments provide a particularly advantageous way for the power transmitter to provide a response to a query message from the power receiver. It may allow effective, reliable and/or low complexity detection at the power receiver. A particular advantage is that detection may be improved and/or facilitated.

The modification may be such that the power of the power signal is increased for the power control error message requesting the power to be reduced, and decreased for the power control error messages requesting the power to be increased.

The modification processor may specifically be arranged to confirm, accept or acknowledge a request from the power receiver provided in the query message by inversing the sign of the requested power change, and may reject the request by continuing to amend the power of the power signal in response to the power control error messages.

In accordance with an optional feature of the invention, the first processor is arranged to modify the responses to the power control error messages in accordance with a first pattern of modifications to responses to power control error messages.

This may in many embodiments provide a particularly advantageous way for the power transmitter to provide a response to the query message. The pattern may comprise a plurality of power control error messages, i.e. a modification to a plurality of power control error messages may be specified by the pattern. The pattern may be a predetermined pattern, and may typically be known in advance by the power receiver. The pattern may include one or more null modifications, i.e. for one or more power control error messages of the pattern, the power change may be the same as for normal operation, and may specifically correspond to that requested by the power control error messages. However, at least one, and typically more or all, power control error messages will have a modification that alters the power change with respect to normal power control operation.

In accordance with an optional feature of the invention, the first processor is arranged to select the first pattern from a plurality of patterns of modifications to responses to power control error messages in response to the query message, each pattern of the plurality of patterns corresponding to a different response to the query message.

This may be particularly efficient in many embodiments. The system may support that a plurality of different responses to the query message can be provided by the power transmitter thereby allowing more complex, efficient and/or flexible operation.

In accordance with an optional feature of the invention, the first pattern comprises at least one modification corresponding to no change of power of the power signal and at least one modification corresponding to changing the power of the power signal in accordance with the request of the power control error message.

This may be particularly efficient in many embodiments. In particular, it may in many embodiments allow low complexity and reliable detection while also providing increased robustness to errors.

In accordance with an optional feature of the invention, the query message comprises an indication of a desired modification of the response of the power loop controller to power control error messages corresponding to a response to the query message.

This may facilitate operation and/or allow enhanced or improved operation. For example, the power receiver may specify a query message as well as a set of possible responses where each response is indicated by a specific set of modifications to responses to power control error messages.

The approach may utilize the power receiver indicating how the power transmitter can respond to the query message.

In accordance with an optional feature of the invention, the modification processor is arranged to change the power of the power signal by changing an inductor current.

The modification processor may specifically be arranged to control the inductor current in response to the power control error messages. This may be particularly attractive as it directly corresponds to the magnetic flux and potential, and thereby provides an easy to detect variation.

In accordance with an optional feature of the invention, the query message comprises a device identification, and the modification processor is arranged to modify the response dependent on the device identification.

This may provide a particularly advantageous operation in many embodiments. The device identification may specifically be a query to the power transmitter requesting information of whether the power transmitter can support functionality of the specific device. In particular, the power transmitter may by potentially modifying the responses to the power control error messages to indicate whether it can support all functionality of the power receiver or just part of the functionality. The power receiver can accordingly determine whether to employ full functionality or only reduced functionality.

In accordance with an optional feature of the invention, the query message comprises an indication of a technical specification with which the power receiver complies, and the modification processor is arranged to modify the response dependent on the indication of a technical specification.

This may provide a particularly advantageous operation in many embodiments. The indication of the technical specification may specifically be an indication of a version number of e.g. a Standards specification. The power transmitter may by potentially modifying the responses to the power control error messages to indicate whether it can support all functionality of the power receiver or just part of the functionality. The power receiver can accordingly determine whether to employ full functionality or only reduced functionality.

Specifically, the power transmitter may modify the responses to the power control error messages to indicate a technical specification with which it complies, e.g. it may modify the responses to indicate the version number of the standard with which it complies. The indication may for example be a relative indication, e.g. if the power transmitter is the same or higher version than indicated by the query message then the power transmitter modifies the responses to the power control error messages and otherwise it does not.

In accordance with an optional feature of the invention, the query message is comprised in a configuration message transmitted prior to initialization of a power transfer phase.

This may provide a particularly advantageous operation in many embodiments. In particular, it may reduce modifications to existing approaches and may in many embodiments allow an early determination of compatibility between the power transmitter and the power receiver 105.

In accordance with an optional feature of the invention, the modification is further dependent on a capability of the power transmitter.

The approach may allow the power transmitter to provide information to the power receiver of what services and functions the power transmitter can support. This may allow improved performance, and specifically may allow a dynamic adaptation between devices allowing them to use new functionality while ensuring that they remain compatible with legacy equipment.

In accordance with an optional feature of the invention, the modification processor is arranged to modify the response of the power loop controller during a power transfer phase.

The approach may allow advantageous bi-directional communication during a power transfer phase. The approach may reduce the impact on the power signal, and may allow the communication to the power receiver to be carried out during a power transfer mode wherein the power of the power signal may be dynamically changing. The approach may allow efficient communication using the power signal even during operations where power is being transferred and provided to e.g. a dynamically changing load. This can be achieved without the impact on the power signal normally associated with conventional modulation of the power signal.

During the power transfer phase, power is provided to a load of the power receiver. A closed power control loop is operated during the power transfer phase. The power of the power signal may thus be dependent on power requests of the power control error messages.

According to an aspect of the invention there is provided a power receiver for receiving power from a power transmitter using a wireless inductive power signal, the power receiver comprising: an inductor for receiving the power signal; a transmitter for transmitting data messages to the power transmitter, the data messages being communicated by load modulation of the power signal; a query message processor for transmitting a query message to the power transmitter; a power loop controller for transmitting power control error messages to the power transmitter, at least some of the power control error messages requesting a change in a power of the power signal; a power signal monitor for monitoring power variations in the power signal; a response processor for determining a response to the query message in response to a comparison of the power variations in the power signal and power variations requested by the power control error messages.

The approach may allow improved operation and may in particular provide a practical, low complexity and/or flexible approach for supporting a bidirectional communication with a power transmitter.

The query message and the power control error messages can be transmitted by the power receiver, i.e. can be communicated by load modulation (also known as backscatter modulation).

The response processor may determine the response to the query message in response to a discrepancy between measured power variations for the power signal and power variations as requested by the power control error messages. The response processor may compare the measured power variations to a set of possible power variations corresponding to different modifications applied to the expected variations resulting from the power control error messages, and may determine the response to the query as the response associated with the set having the closest similarity with the measured power variations in accordance with any suitable similarity criterion.

According to an aspect of the invention there is provided a power transfer system comprising a power transmitter and power receiver as described above.

According to an aspect of the invention there is provided a method of operation for a power transmitter arranged to transfer power to a power receiver using a wireless inductive power signal, the power transmitter comprising an inductor for providing the power signal and a power signal generator for driving the inductor to provide the power signal; the method comprising: receiving data messages from the power receiver, the data messages being communicated by load modulation of the power signal; controlling a power of the power signal in response to power control error messages received from the power receiver; detecting that a query message has been received from the power receiver; and modifying a response to power control error messages in response to the query message.

According to an aspect of the invention there is provided a method of operation for a power receiver arranged to receive power from a power transmitter using a wireless inductive power signal, the power receiver comprising an inductor for receiving the power signal; the method comprising: transmitting a query message to the power transmitter by load modulation of the power signal; transmitting power control error messages to the power transmitter by load modulation of the power signal, at least some of the power control error messages requesting a change in a power of the power signal; monitoring power variations in the power signal; and determining a response to the query message in response to a comparison of the power variations in the power signal and power variations requested by the power control error messages.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
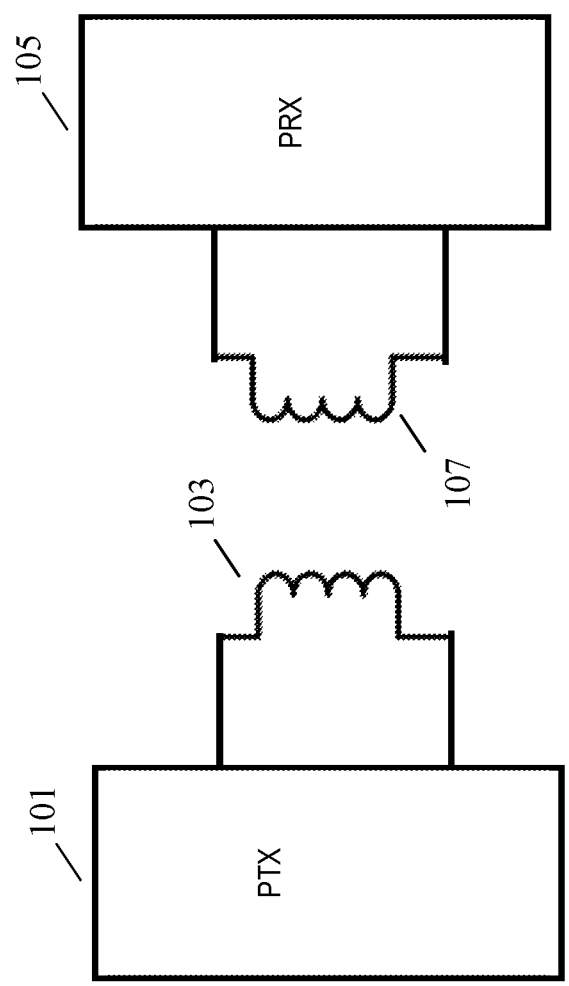
FIG. 1 illustrates an example of a power transfer system comprising a power transmitter and a power receiver in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a power signal which is propagated as a magnetic flux by the transmitter coil 103. The power signal may typically have a frequency between around 100 kHz to 200 kHz. The transmitter coil 103 and the receiver coil 107 are loosely coupled and thus the receiver coil picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 105 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On physical level, the communication channel from the power receiver 105 to the power transmitter 101 is implemented by using the power signal as carrier. The power receiver 105 modulates the load of the receiver coil 105. This results in corresponding variations in the power signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless Power Transfer, Volume I: Low Power, Part 1: Interface Definition, Version 1.0 July 2010, published by the Wireless Power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105. The messages from the power receiver 105 are not communicated continuously but are communicated in intervals.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal. Thus, in the power transfer phase, the power receiver 105 also performs load modulation of the power signal in load modulation intervals in order to communicate information to the power transmitter 101.

It is noted that the Qi wireless power specification versions 1.0 and 1.1 define only communication from the power receiver 105 to the power transmitter 101, i.e. it defines only a unidirectional communication.

However, in the system of FIG. 1 bidirectional communication is used, i.e. communication of data is also possible from the power transmitter 101 to the power receiver 105. Various applications may benefit from such communication, for example: setting a power receiver in test mode, setting a power receiver in calibration mode, adapting functionality of the power receiver 105 and the power transmitter 101 to each other, etc. The communication from power transmitter to power receiver can e.g. specifically be used for communicating command, control or status information from the power transmitter 101 to the power receiver 105 thereby allowing enhanced and more flexible operation.

Figure 2:
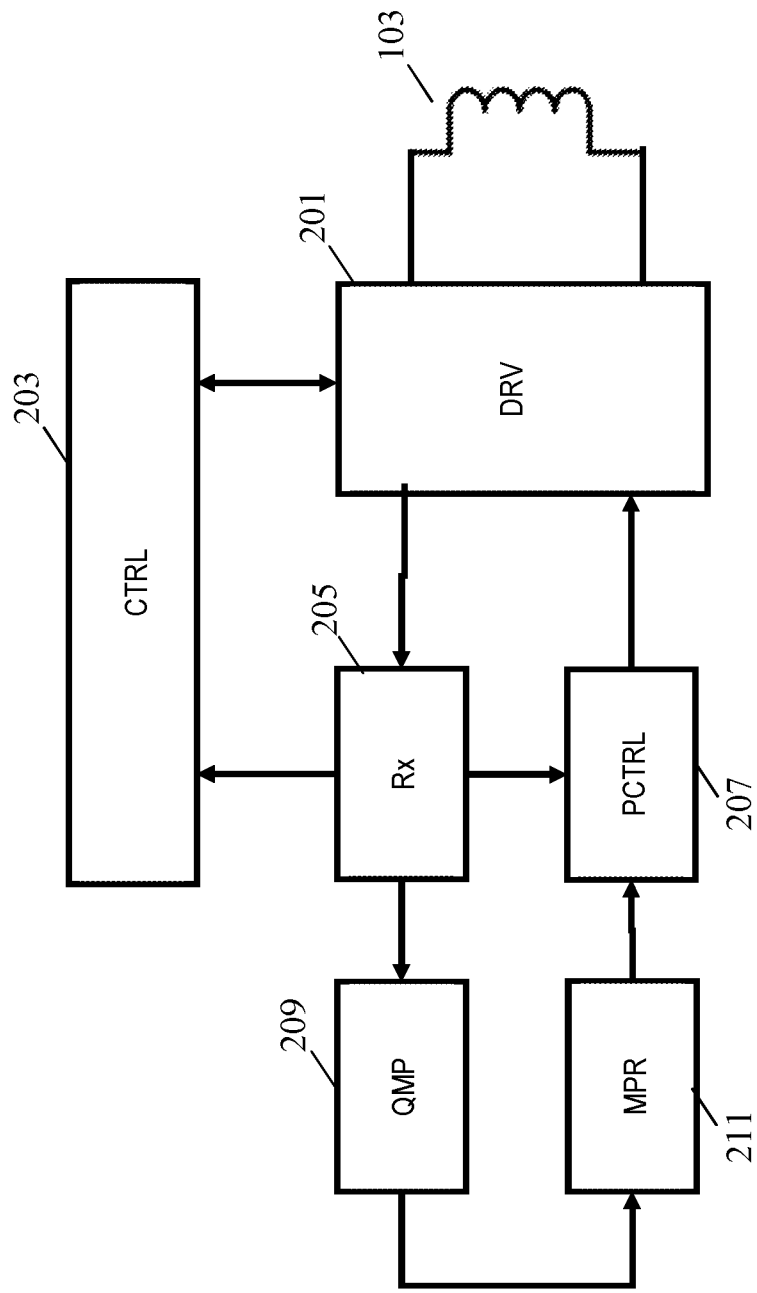
FIG. 2 illustrates an example of elements of a power transmitter in accordance with some embodiments of the invention.

FIG. 2 illustrates the power transmitter 101 in more detail.

Figure 3:
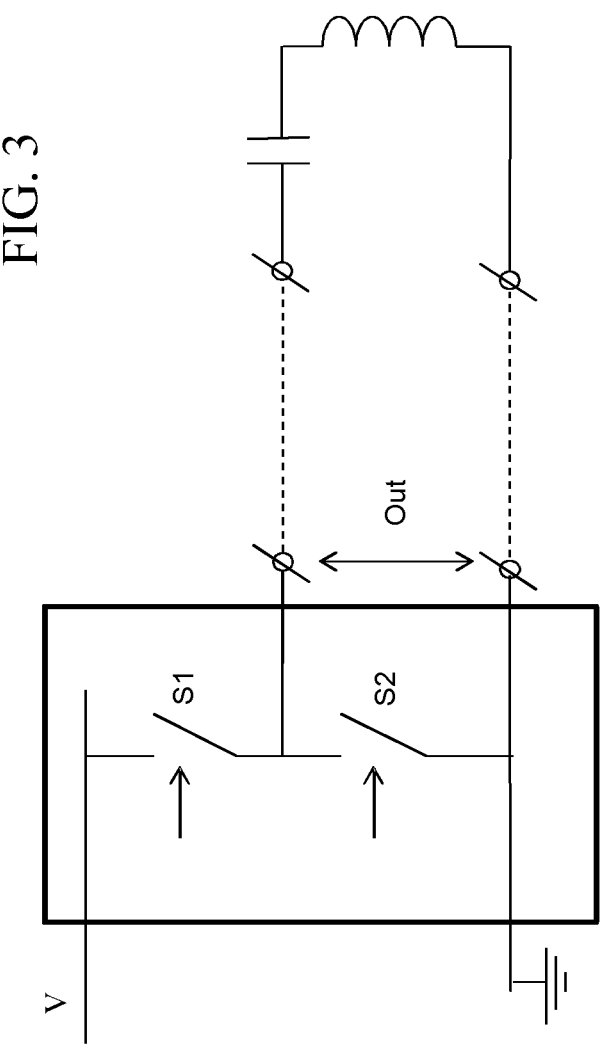
FIG. 3 illustrates an example of elements of a power transmitter in accordance with some embodiments of the invention.
Figure 4:
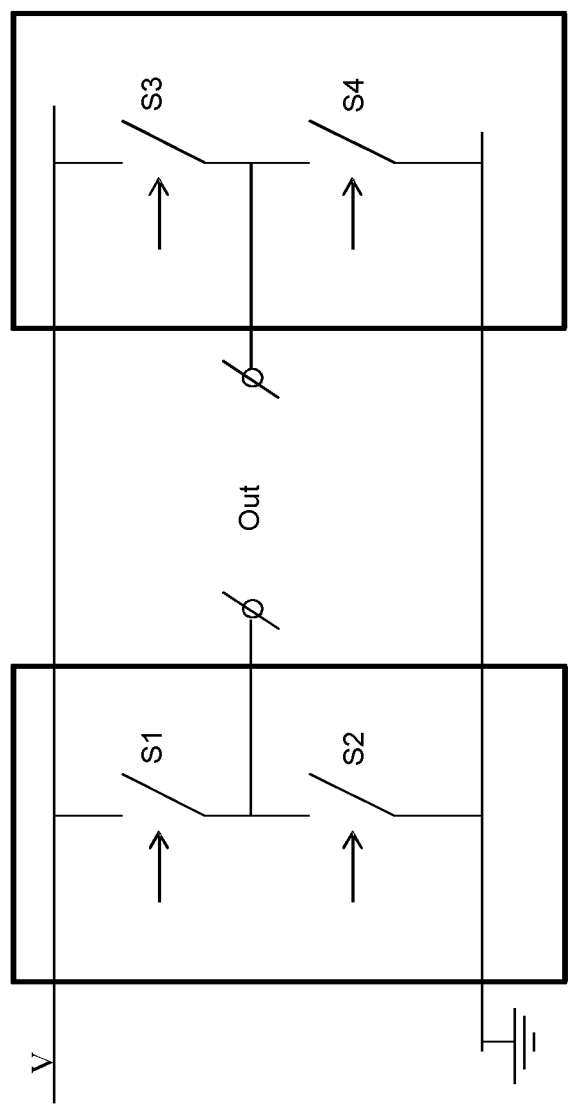
FIG. 4 illustrates an example of elements of a power transmitter in accordance with some embodiments of the invention.

The transmitter coil/inductor 103 is coupled to a driver 201 which drives the transmitter coil/inductor 103 (henceforth the term transmitter coil will be used) to provide the power signal. The driver 201 thus generates the current and voltage which is fed to the transmitter coil 103. The driver 201 is typically a drive circuit in the form of an inverter which generates an alternating signal from a DC Voltage. FIG. 3 shows a half-bridge inverter. The switches S1 and S2 are controlled such that they are never closed at the same time. Alternatingly S1 is closed while S2 is open, and S2 is closed while S1 is open. The switches are opened and closed with the desired frequency, thereby generating an alternating signal at the output. Typically the output of the inverter is connected to the transmitter coil via a resonance capacitor. FIG. 4 shows a full-bridge inverter. The switches S1 and S2 are controlled such that they are never closed at the same time. Similarly, the switches S3 and S4 are controlled such that they are never closed at the same time. Alternatingly switches S1 and S4 are closed while S2 and S3 are open, and then S2 and S3 are closed while S1 and S4 are open, thereby creating a block-wave signal at the output. The switches are opened and closed with the desired frequency.

The driver 201 is coupled to a power transmitter controller 203 which comprises various control functionality for operating the power transfer function, and which in the specific example is arranged to operate the power transmitter 101 in accordance with the Qi standard. For example, the power transmitter controller 203 may be arranged to perform the Identification and Configuration as well as the power transfer phases of the Qi standard.

The driver 201 is further coupled to a receiver 205 which is arranged to receive messages from the power receiver 105. The messages are provided by load modulation as will be known to the skilled person.

The power transmitter 101 further comprises a power loop controller 207, which is arranged to control the power of the power signal in response to power control error messages received from the power receiver. The power loop controller 207 is coupled to the receiver 205, which receives power control error messages from the power receiver 105 and forwards the corresponding power requests to the power loop controller 207.

In the specific example, the power receiver 105 generates a power control error message at least every 250 msec. The power control error messages are communicated to the power transmitter 101 by load modulating the power signal. Each power control error message provides an indication of whether the measured power at the power receiver 105 is above or below (or at) the desired value. Thus, each power control error message may be considered a request from the power receiver 105 to the power transmitter 101 to either increase or decrease the power signal of the power signal.

In some embodiments, the power control error messages may simply request an increase or decrease of power (or equivalently indicate whether the detected power is above or below a desired value). In other embodiments, the power control error messages may indicate a magnitude of the desired power change. In yet other embodiments, the power control error messages may directly indicate an absolute desired power.

The power loop controller 207 is arranged to change the power of the power signal. Thus, the power loop controller 207 can indicate to the driver 201 that the power should be increased or decreased, and may in many embodiments control the power directly.

It will be appreciated that any suitable way of controlling the power of the power signal may be used. Specifically, the power loop controller 207 may directly or indirectly control the inductor current for the transmitter coil 103. This may for example be achieved by changing the voltage across the transmitter coil 103, the supply voltage to the drive circuit (e.g. to the inverter), directly controlling the current by a current regulator, or e.g. by changing the frequency of the drive signal as this will modify the current due to the output of the system being a resonant circuit.

During normal operation, the power transmitter 101 and power receiver 105 thus performs a conventional power control e.g. in accordance with the Qi standard. The power transmitter 101 and power receiver 105 specifically establish a closed loop power control, i.e. a power control loop is employed. The power control loop is based on power control error messages that repeatedly and iteratively are transmitted from the power receiver 105. The power control error messages may in particular be transmitted by the power receiver 105 (and thus received at the power transmitter 101) with a time interval below a given value, such as e.g. 250 msec (corresponding to the approach for Qi). The power control error messages may be continuously transmitted by the power receiver 105 and received by the power transmitter 101, when in/during a power transfer phase. Thus, when power transfer is being performed, the power receiver 105 will continuously transmit power control error messages to the power transmitter 101. The power loop controller 207 of the power transmitter 101 will continuously control a power level of the power signal in response to the power control error messages. The closed power control loop thus allows the power receiver 105 to control the power of the power signal, and specifically allows the power receiver 105 to adapt the power of the power signal to match the specific (and potentially dynamically changed) characteristics of the load supplied by the power transfer. This power control loop allows the system to continuously adapt to the load conditions during a power transfer operation, and specifically during a power transfer phase.

However, the system is furthermore arranged to sometimes temporarily deviate from this operation and to set the power of the power signal differently than requested by the power control error messages from the power receiver 105 This deviation is performed in response to receiving a query message from the power receiver 105 and constitutes a reply to the query message. Thus, the deviation in how the power transmitter 101 responds to one or more power control error messages provides an indication to the power receiver 105 of a response to the query message. In this way, the approach introduces bidirectional communication to a power transfer system, such as a Qi system, but without requiring separate communication functionality and without additional modulation of the power signal. Rather, a temporary variation in the response to power control error messages is used to communicate from the power transmitter 101 to the power receiver 105.

Thus, the system can temporality modify the operation of the power control loop and how the received power control error messages are processed in order to communicate a response to the query message. The system may thus switch between a first and (at least) a second power control mode. The first mode is used during times when there is no communication from the power transmitter 101 to the power receiver 105. Thus, the first mode may be considered the normal or nominal power control mode. In the second mode, the response to the power control error messages deviates from the response that would be generated by the power loop controller 207 when this is in the first mode of operation. In some embodiments, there may be a number of different power control operating modes where each corresponds to different responses to the power control error messages (at least for some power control error messages). Each power control mode may represent (associated/linked with) one response message to the query message. Thus, the power transmitter 101 may select one of the power control modes depending on which response to the query message it wants to communicate to the power receiver 105. The resulting changes to the power signal will be different for a given set of power control error messages, and these resulting changes can be detected by the power receiver 105. The responses to power control error messages in the different power control modes may be predetermined, and accordingly the power receiver 105 can evaluate the possible power control modes to identify the one that best matches the variations detected on the power signal. The response message corresponding to this best matching power control mode is then considered the received message by the power receiver 105.

Specifically, the power transmitter 101 comprises a query message processor 209 which is coupled to the receiver 205. When the power receiver 105 transmits a query message, such as for example a message inquiring whether the power transmitter 101 can support a given functionality, the message is detected by the receiver 205 and forwarded to the query message processor 209 which processes it. Specifically, the power receiver 105 may determine a suitable response to the query message, such as whether to accept or reject a request indicated by the query message. As a specific example, the query message may indicate a standards version with which the power receiver 105 complies, and the query message processor 209 may determine whether the power transmitter 101 complies with the same (or a newer) version of the standard, i.e. whether all functionality of the power receiver 105 can be supported.

The query message processor 209 is coupled to a modification processor 211 which is further coupled to the power loop controller 207. The modification processor 211 is arranged to temporarily modify how the power loop controller 207 reacts to the received power control error messages. Specifically, the modification processor 211 may control the power loop controller 207 to change how the power of the power signal is changed in response to the power control error messages. As a specific example, the modification processor 211 may change the response for, say, two of the power control error messages such that the power change is inverse of that which is requested, i.e. a power up request results in a reduced power, and a power down request results in an increased power.

The modification processor 211 is arranged to modify the response dependent on the response that is to be given to the query message. Specifically, for a negative response to the query message, the query message processor 209 may not introduce any modifications and thus power control may proceed as normal whereas for a positive response to the query message the query message processor 209 can modify the operation to result in a different power level than if no modification had been introduced.

The power receiver 105 can detect whether any modification has been introduced. Specifically, the power receiver 105 can continuously monitor the power level of the received power signal and can detect whether the variations change in accordance with the transmitted power control error messages or whether there is a deviation corresponding to a possible message from the power transmitter 101.

Figure 5:
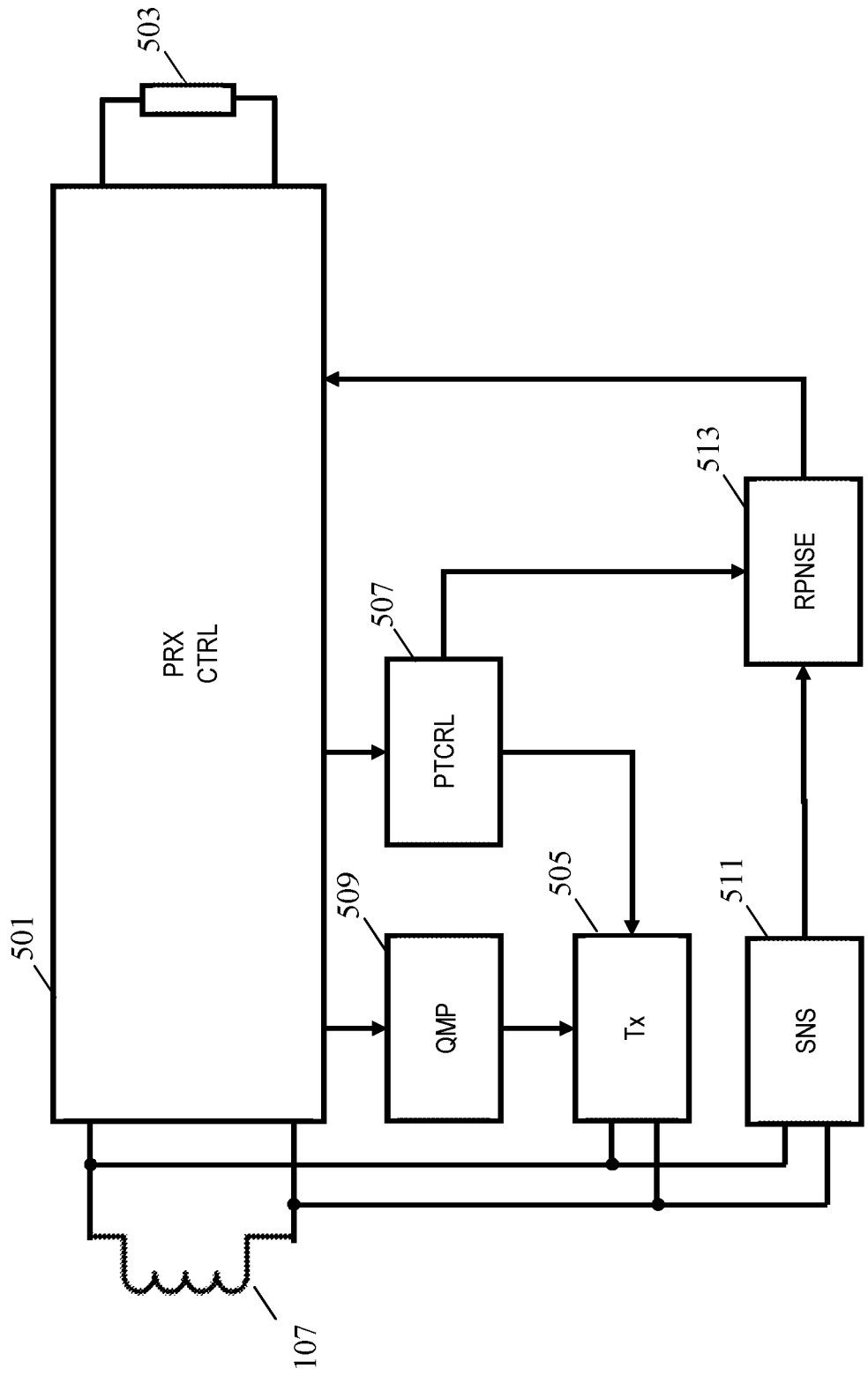
FIG. 5 illustrates an example of elements of a power receiver in accordance with some embodiments of the invention.

FIG. 5 illustrates elements of the power receiver 105 in more detail.

The receiver coil 107 is coupled to a power receiver controller 501 which comprises various functionality for operating the power transfer function, and is in the specific example arranged to operate the power receiver 105 in accordance with the Qi standard. For example, the power receiver 105 may be arranged to perform the Identification and Configuration as well as the power transfer phases of the Qi standard.

The power receiver controller 501 is arranged to receive the power signal and to extract the power during the power transfer phase. The power receiver controller 501 is coupled to a power load 503 which is the load powered from the power transmitter 101 during the power transfer phase. The power load 503 may be an external power load but is often part of the power receiver device, such as a battery, display or other functionality of the power receiver (e.g. for a smart phone the power load may correspond to the combined functionality of the smart phone).

The power receiver 105 furthermore comprises a message transmitter 505 which is arranged to transmit messages to the power transmitter 101 by load modulation.

The message transmitter 505 is coupled to the receiver coil 107 and can send data to the power transmitter 101 via the receiver coil 107 and the transmitter coil 103 coupling. Specifically, the message transmitter 505 comprises a changeable load which is coupled across the receiver coil 107. The message transmitter 505 then varies the changeable load thereby modulating the load of the receiver coil 107 in order to generate a reflected signal that can be detected by the power transmitter 101.

As an example, the receiver coil 107 may receive the power signal for inductive power transfer from the transmitter coil 103 and may send a reflected signal to the transmitter coil 103 by varying the changeable load. Thus, the variations of the load provide a modulation of the power signal. The message transmitter 505 can control the amplitude (and/or frequency and/or phase of the reflected signal), i.e. it controls the operation of the changeable load, e.g. by connecting/disconnecting an impedance circuit.

The receiver 205 can detect the reflected signal, i.e. the load variations introduced by the message transmitter 505, e.g. by sensing the current or voltage on the transmitter coil 103. It can then demodulate the detected signal, e.g. by converting changes in the amplitude or phase of the detected signal into bits.

The power receiver 105 comprises a power loop processor 507 which operates the power control loop together with the power transmitter 101. Specifically, based on measurements performed by the power receiver controller 501, the power loop processor 507 generates power control error messages at typically regular intervals. In particular, during a power transfer phase, the power loop processor 507 generates a power control error message at least every 250 msec. The power control error messages are fed to the message transmitter 505 which proceeds to communicate them to the power transmitter 101 by load modulation.

The power control error messages are indicative of a relationship between a power level of the power signal and a power consumption of the power load 503 of the power receiver 105. The power load 503 is the load powered by the power receiver 105 (during a power transfer phase). The power control error messages may specifically indicate a request for the power of the power signal to be increased or decreased in order to match the required power transfer for powering the load 503. The power loop controller 507 may specifically generate the power control error messages in response to a comparison of the received power of the power signal to a power consumption of the load 503. The comparison may be performed dynamically and continuously, and power control error messages may be generated repeatedly, e.g. with a maximum interval of 250 msec, thereby allowing a continuous and dynamic adaptation of the power signal by the power transmitter 101.

Specifically, in the power transfer phase the actual power transfer takes place. After having communicated its required power, the power receiver 105 will connect the output load to supply it with the received power. The power receiver 105 monitors the output load and measures the control error between the actual value and the desired value of a certain operating point. For example, it may compare a voltage of an energy reservoir (e.g. a large capacitor) which is charged from the power signal and from which the power to the load 503 is drawn. The power receiver 105 communicates such control errors to the power transmitter with a minimum rate of e.g. every 250 ms to indicate its presence to the power transmitter, and to communicate a desire for a change, or for no change, of the power signal. In case the actual value of the operating point equals the desired value, the power receiver communicates a control error with the value zero, meaning that the power signal should not change. In case the power receiver communicates a control error which is not equal to zero, it expects the power transmitter to change the power signal accordingly.

During the power transfer phase, the power receiver 105 and power transmitter 101 thus operate a power control loop that controls the power of the power signal to substantially be at a desired operating point.

In the system of FIG. 1, the power receiver 105 may furthermore be arranged to transmit a query message to the power transmitter 101. Accordingly, the power receiver 105 comprises a query message generator 509 which is coupled to the message transmitter 505 and which is arranged to generate the query message and feed it to the message transmitter 505 for transmission to the power transmitter 101.

The query message may be any message transmitted to the power transmitter 101 and to which the power transmitter 101 may respond, i.e. it may be any message for which the power receiver 105 may proceed to detect whether a response is generated by the power transmitter 101.

The query message may be transmitted at any suitable time. For example, it may be transmitted during a time when the power control loop is operational and power control error messages are transmitted to the power transmitter 101. In such scenarios, the response of the power transmitter 101 may be determined relatively quickly as the power transmitter 101 may potentially proceed to modify power control error messages instantly upon receiving the query message. Specifically, the query message may be transmitted during the power transfer phase. Alternatively or additionally, a query message may be transmitted at a time when the power control loop is not active, such as e.g. when the power of the power signal is maintained constant. In such scenarios, the power transmitter 101 may respond when the power control loop starts up. For example, the query message may be communicated during the Identification and Configuration phase, and the power transmitter 101 may respond when the power transfer phase starts.

The power receiver 105 comprises a sense processor 511 which is arranged to monitor power variations in the power signal. Specifically, the sense processor 511 may sense the inductor current and voltage of the receiver coil 107 and may detect when the power transmitter 101 changes the power of the power signal and thus the flux affecting the receiver coil 107.

The sense processor 511 is coupled to a response processor 513 which is further coupled to the power loop processor 507. The response processor 513 receives information of the measured power variations of the power signal as well as the power change requests of the transmitted power control error messages. It then proceeds to compare the power variations in the power signal to the power variations requested by the power control error messages. Based on this comparison, the response processor can determine the reply of the power transmitter 101 to the transmitted query message.

For example, the query message may be a message requesting information about whether the power transmitter 101 is capable of supporting the full functionality of the power receiver 105. For example, the query message may indicate a Standards version with which the power receiver 105 complies, such as e.g. Standards version B. The development of the Standard from version A to version B may include the addition of a bidirectional communication using the power control loop as described. Specifically, it may be defined in version B of the Standard that the power transmitter 101 shall indicate that it is version B compatible by changing the power of the power signal in as requested by the first power control error message but ignore the power requests of the next two power control error messages after receipt of a message indicating that the power receiver 105 is a version B device. During the configuration phase, the power receiver 105 may send a message to the power transmitter 101 indicating that the power receiver 105 is a version B device. The power transmitter 101 is itself a version B device, and in response it will accordingly (when the power transfer phase starts up) change the power in accordance with the request of the first power control error message, then ignore the next two power control error messages, and then proceed to change the power in accordance with the power control error messages as for a normal power control operation. The resulting power variations will then include a step change corresponding to the first power control error message, then a substantially constant power for the next two power control error messages, followed by step changes that follow the power control error messages. This power variation is detected by the sense processor 511 and fed to the response processor 513 which proceeds to detect that the power variation pattern corresponds to that expected from a version B power transmitter. The response processor 513 accordingly detects that power transmitter 101 has confirmed that it is a version B device. This information is fed to the power receiver controller 501 which can then proceed to operate with the full functionality of version B.

However, a version A power transmitter will not be designed to modify the power control operation. Accordingly, the power signal will have power steps for each of the power control error messages. This can be detected by the sense processor 511 and used by the response processor 513 to identify that the power transmitter is indeed a version A power transmitter. The result of the determination is fed to power receiver controller 501 which accordingly proceeds to operate in accordance with version A of the standard. Specifically, it may proceed to not use any functionality introduced by the update from version A to version B of the Standards.

The approach may be particularly suitable for e.g. Qi systems. For example, version 1.0 and 1.1 of the Qi version include reserved messages intended for use in future developments of the standard. However, as many deployed power transmitters have been found to terminate power transfers if a reserved message is received (rather than ignore it), a future power receiver cannot use the reserved messages as they will cause malfunction when used with version 1.0 or 1.1 power transmitters. However, if the described approach is used to identify whether the power transmitter with which the power receiver is interworking is a version 1.0/1.1 or later version, the power transmitter can adapt its operation accordingly. Specifically, if the power transmitter is version 1.0/1.1, the power receiver proceeds to avoid using any reserved messages. However, if it is found that the power transmitter is a later version device, the power receiver may proceed to use the reserved messages as these may have been defined in the later standards specifications.

The described approach provides communication from the power transmitter 101 to the power receiver 105 by changing how the power control loop operates and specifically by changing how the power loop controller 507 processes the received power control error messages. Thus, the information is not communicated to the power receiver 105 simply by a predetermined change in a predetermined characteristic of the power signal (such as an amplitude, frequency or phase change), but instead the behavior of the running closed power control loop is changed. These modifications in how the power loop controller 507 responds to the received power control error messages can be detected by the power receiver 105. Specifically, the power receiver 105 can detect how the power signal varies and compare that to the expected variations for the different possible power control loop behaviors. The system accordingly changes a characteristic of the mode of operation for the running power control loop and it is this change in operation which carries the information content.

In order to decode the information, the power receiver 105 evaluates the operation of the power control loop. It specifically compares the changes of the power of the power signal with the expected power variations resulting from the transmitted power control error messages. Thus, the behavior of the power signal is compared to the behavior associated with and expected from the transmitted power control error messages.

For example, two possible answers may be possible to the query message (i.e. it may be a binary query that can be answered by a single bit). The power receiver 105 may transmit a number of power control error messages that reflect the desired changes to the power of the power signal as assessed by the power receiver 105. The desired changes are determined based on a comparison of the received power compared to the power consumed by the load (e.g. by measuring the voltage across a capacitor operating as an energy reservoir). If the answer to the query message is a negative response (e.g. indication that the power transmitter 101 cannot support the requested function), the power loop controller 207 may continue the normal operation of the power control loop. Thus, the power of the power signal is modified as requested in the power control error messages. The power receiver 105 can detect that the power signal changes corresponding to requests of the power control error messages and thus that the response to the query message is negative. It should be noted that the actual changes to the power signal are not pre-determined or can be assumed in advance. Rather, they are given by the requests of the power control error messages and the resulting variations on the power signal depend both on the power control error messages and on the message being communicated. The actual changes in the power level that indicate a negative reply depend on the power requests contained in the power control error messages, and are through this dependency also dependent on the current operating conditions, and specifically on the current power level of the power signal and on the load conditions. The power signal impact is thus not predetermined as for conventional modulation of the power signal.

If the power transmitter 101 seeks to respond to the query message by a positive response, it can proceed temporarily to change the operation of the power control loop. Specifically, it temporarily (e.g. for a predetermined number of power control error messages) modifies the response of the power loop controller 207. Thus, for a number of power control error messages, the power loop controller 207 modifies its response to the power control error messages, i.e. the changes to the power signal do not correspond to the power changes requested in the power control error messages. The power receiver 105 may detect that the expected power variations for the specific power control error messages that were transmitted are not present on the power signal. It can accordingly determine that the power transmitter 101 has temporarily changed the operation of the power control loop and that the power loop controller 507 temporarily responds differently to the received power control error messages. It can accordingly determine that the response to the query message was a positive response (e.g. indicating that the power transmitter 101 can support the requested function).

An advantage of one of the possible responses corresponding to a normal power control operation (i.e. as if no communication was undertaken) is that it allows for a default response e.g. in cases where an error occurs in the communication of the query message. For example, if a query message requesting the power transmitter 101 to support an enhanced feature is lost, the power transmitter 101 will proceed to operate the power control loop normally. This will be interpreted by the power receiver 105 as the power transmitter 101 not being able to use the enhanced feature. This will mitigate or avoid the risk that a communication error causes the power receiver 105 to use an enhanced feature that the power transmitter 101 cannot support.

Thus, the power control loop may be able to operate in different modes wherein the different modes have different responses to the power control error messages, i.e. the changes introduced to the power signal in response to the power control error messages are different. For a given interval (typically for a number of power control error messages), the power transmitter 101 may select one mode of operation from the possible modes of operation depending on the response to the query message. Thus, it is the mode selection rather than the absolute power changes to the power signal that carries the response to the power receiver 105. Specifically, each mode of operation may represent one response out of a set of possible responses to the query message. By temporarily selecting one mode of operation out of the set of possible modes, the power transmitter 101 can communicate the response associated with the selected mode.

In many embodiments, the power transmitter 101 may respond to the query message by selecting a response from a set of possible responses. Each of the possible responses may be represented by a different response to a set of power control error messages by the power loop controller 207. Each of the possible responses may be associated with a different mode of operation for the power control loop.

Also, at least one response of the possible responses is represented by a response to power control error messages which deviates from the response of the power loop controller 207 to power control error messages in the absence of a communication to the power receiver 105.

Furthermore, at least one response of the possible responses is represented by a response to power control error messages that results in a power variation of the power signal, which is dependent on the power control error messages of the set of power control error messages. Thus, at least one response is a relative response (and as such is dependent on the specific requests from the power receiver 105, and accordingly is dependent on the current operating conditions such as specifically the power consumption of the load 503).

It should also be noted that the power control error messages are power control error messages, i.e. they are not dedicated messages used only for the communication but rather are (normal) power control error messages that are part of the closed power control loop.

The described system may thus use existing functionality and operations, namely a running power control loop, to provide communication from a power transmitter 101 to a power receiver 105. The data is communicated, not by simply modulating the power signal, but rather by modifying how this running closed power control loop operates. Indeed, the system allows for data to be communicated to the power receiver 105 simply by the power control loop operating exactly like it does when no communication is undertaken (e.g. for the default response to the query message). Thus, the approach may in many situations reduce the impact on the power signal of communication from the power transmitter 101 to the power receiver 105. Indeed, in many embodiments, the communication of a response to the query message may have no impact on the power signal in most scenarios, and as a worst case only introduce a short delay in the adaptation of the power of the power signal to the current conditions.

For example, in some embodiments, a positive response may be communicated by no change in the operation of the power loop thereby resulting in no impact on the power signal and thus on the power transfer operation. A negative response may e.g. be communicated by switching the power loop controller 507 into a mode where it ignores e.g. two power control error messages after which it switches back to normal operation. After switching back into normal operation, the subsequent power control error messages will continue to repeat the same request (as the power signal has not changed and thus the same relationship exists between the provided power and the consumed power). This will cause the closed loop power control to adapt the power of the power signal to the desired level. Thus, the adaptation of the power signal is merely delayed slightly. In many scenarios, the modification of the responses to the power control error messages may reflect a capability of the power transmitter 101. Specifically, as described above, the modification of the responses to the power control error messages, and specifically whether any modification is introduced, can depend on whether the power transmitter can support the functionality/capability of the power receiver 105 indicated in the query message. In the specific example, the functionality/capability is indicated by a version number but it will be clear that other approaches can be used. For example, the query message may include a specific indication of a specific capability, and the response may reflect whether the power transmitter 101 can support this capability. As a specific example, the query message may simply query whether the power transmitter 101 can indeed support bidirectional communication, and the power transmitter 101 can respond positively simply by replying using the bidirectional communication as described above.

As indicated previously, the modification processor 211 may for example modify the responses to the power control error messages by simply ignoring one or more power control error messages. Thus, for one or more power control error messages, the modification processor 211 may proceed to prevent that the requested change in power is applied to the power signal. The absence of a change corresponding to the power control error messages can be detected by the power receiver 105 and accordingly provide an indication of a response to the query message. Specifically, if the query message includes a request, the absence of power variations in response to power control error messages requesting variations may indicate acceptance of a request and a presence of the power variations may indicate a rejection.

In some embodiments, the modification processor 211 may modify the response to one or more power control error message by changing the direction in which the power change occurs. Thus, for a power control error message requesting a power increase, the power may actually be decreased and for a power control error message requesting a power decrease, the power may be increased. This may make the modifications/alterations more pronounced and may facilitate and or increase the reliability of detection by the power receiver 105. Thus, more reliable communication may typically be achieved.

Thus, as an example, if the request of the query message is rejected, the power transmitter 101 proceeds to respond to power control error messages as it would normally do during a power control operation. If however, the request is accepted, the power transmitter 101 proceeds to effectively change the sign of one or more of the power control error messages, i.e. it proceeds to change the power in the opposite direction of what is requested by the power control error messages.

In some embodiments, the power control error messages may include power control error messages that request that no change is made to the power of the power signal, i.e. that the power signal is currently at the right level. In such examples, the modification processor 211 may e.g. proceed to introduce a predetermined power change when a power control error message indicates that no power change should be introduced.

The modification processor 211 may in many embodiments store a set of patterns where each pattern defines which modifications should be introduced to a number of power control error message responses. Specifically, each pattern may correspond to a given response.

In some embodiments, each pattern may comprise only a modification for one power control error message but in many embodiments each pattern may comprise a modification for a plurality of power control error messages. The number of power control error message modifications may be different for different patterns but will in many embodiments be the same for all patterns.

In some embodiments, the set of patterns may include only a single pattern, e.g. if the approach is simply used to confirm whether the power transmitter 101 is sufficiently new to be able to communicate by modifying the power control operation. This may in itself be indicative of further capability. For example, if the power transmitter 101 can modify the power control operation, this may in itself indicate that it is a version B compatible device, and thus that it also complies with all other further developments of the upgrade to version B. Thus, the power receiver 105 may continue to operate in accordance with this knowledge. For example, it may proceed to request higher powers that are supported in version B but not version A of the standards. Thus, the communication approach may be useful even if no further bidirectional communication was used.

In many embodiments, the power transmitter 101 may be capable of providing more complex responses. For example, there may be a 2, 3, 4 or even more possible responses to the query message, and the set may include one modification pattern for each possible response. The modification processor 211 may from the query message processor 209 receive an indication of which response should be transmitted to the power receiver 105. It may then retrieve the corresponding pattern from the set of possible patterns and proceed to modify the responses to the power control error messages as defined by the appropriate pattern.

In some embodiments, the set of responses may even define an alphabet or set of partial data which can be used to communicate complex data.

Also, the approach may be used hierarchically. For example, initially one or more query messages and responses may be exchanged in order to define a common alphabet/message protocol. For example, the first query message may request that the power transmitter 101 defines which communication protocol should be used. The query message may for example include a set of protocols that the power receiver 105 can understand. The power transmitter 101 can then indicate one of the possible protocols, and subsequent communication may be performed using this protocol, e.g. the power receiver 105 and power transmitter 101 may be configured using a communication exchange based on the selected protocol.

In some embodiments, the query message and response may be used to determine whether to communicate using the power control loop modification method or not. For example, the first query message may request whether the power control loop modification communication method should be used, and the power transmitter 101 may confirm this using the power control modification communication. However, a negative response (e.g. provided using the power control modification communication method) may result in the following communication change using another approach, such as directly communicating data to the power receiver 105 by the power transmitter 101 modulating the data on to the power signal using e.g. amplitude, frequency or phase modulation. Such an approach may be particularly advantageous in being able to meet regulatory requirements in some jurisdictions while allowing more efficient communication in other jurisdictions that do not have these restrictions. For example, in some jurisdictions direct modulation of the power signal may not be appropriate. Therefore, a power transmitter 101 designed for this jurisdiction will respond that the power control modification communication approach should be used. However, in other jurisdictions direct modulation may be acceptable and therefore the power transmitters designed for these jurisdictions will respond that a direct modulation approach will be used thereby potentially implementing a more efficient communication.

In many embodiments, the patterns may comprise at least one modification corresponding to no change of power of the power signal and at least one modification corresponding to a change of the power of the power signal in accordance with the request of the power control error message. Thus, specifically, one or more of the patterns may include one modification that corresponds to keeping the power constant, and thus ignoring the corresponding power control error messages, and a second entry corresponding to treating a power control error message normally, i.e. to change the power as requested by the power control error message. This may ensure that the power signal fluctuates less as a consequence of the modifications carrying information than a power signal for which no modifications are introduced. At the same time, at least one power control error message is treated normally thereby allowing the power receiver 105 to check that normal operation is possible. Thus, the power receiver 105 can differentiate between an intentional suppression of some power changes, and a problem resulting in the power control loop malfunctioning.

In order to correlate the detected power signal variations with the transmitted power control error messages by the power receiver 105, the synchronization of the modifications to the individual power control error messages may be done based on the query message. For example, if the query message is received during the power transfer phase, the power transmitter 101 may proceed to apply the pattern starting at the next received power control error message. Thus, the power receiver 105 will know that the pattern starts at the next power control error message, and it can therefore measure the power change that occurs following the transmission of this message. For example, if the pattern comprises a single modification, the power receiver 105 may first send the query message and may then begin to monitor for a power change after it sends the next power control error message. As the rate of the power control error messages is relatively low (typically less than 10 per second), it is relatively simple to align power changes and power control error messages for the power receiver 105.

If the query message is transmitted during a time when the power control loop is not running, the pattern may be applied to the first power control error message(s) when the power control loop starts. In many such examples, it may be desirable for the power transmitter 101 to respond normally to one or more initial messages in order to ensure that the power control loop is properly initialized and operational.

For example, if a query message is received during the configuration phase, the response may be provided during the power transfer phase. In some embodiments, however, power control may for example be introduced earlier, such as during the configuration phase.

In some embodiments, the power receiver 105 may transmit an indication to the power transmitter 101 of how the power transmitter 101 should respond to the query message, i.e. how the power receiver 105 will interpret the response. Specifically, the query message may comprise an indication of a modification to the response of the power loop controller to power control error messages that correspond to a response to the query message. As a specific example, the query message may comprise an indication that the power transmitter 101 should accept the request from the power receiver 105 by ignoring, say, the next two power control error messages. More generally, the power receiver 105 may comprise a set of patterns of modifications with one pattern being provided for each possible response. The modification processor 211 of the power transmitter 101 may then proceed to apply the appropriate pattern when it has decided how to respond to the query message.

As mentioned previously, the query message may provide an indication of a standards version that the power receiver 105 complies with, or more generally it may provide an indication of a technical specification with which the power receiver complies. For example, it may indicate that it is a version B power receiver. The power transmitter 101 may then proceed to modify the response to one or more power control error messages in response to this technical specification. Specifically, if the power transmitter 101 complies with the same, or a higher version, the modification processor 211 may modify the power control loop operation to provide an indication that it can support all the functionality of the technical specification that the power receiver 105 has indicated.

Alternatively or additionally, the query message may comprise a device identification for the power receiver 105. The device indication may provide a type or model identification for the power receiver 105, or may e.g. provide an individual and unique identity of the power receiver 105. The power transmitter 101 may then proceed to determine a suitable response based on this device identification.

In the following some specific examples illustrating various embodiments will be described. In the examples, the power receiver 105 and power transmitter 101 complies with the Qi standards except for the deviations described herein.

Example 1

In this example, the power transmitter 10 is comprised in a wake-up light. The wake-up light is used with a protective sleeve for a hand-held device (e.g. a phone). The sleeve provides wireless charging functionality to the device (e.g. an existing smartphone), and may be sold as an accessory to the wake-up light. In this example, the query message comprises a device identifier, i.e. a message including the device identifier is considered a query message. After completing the initial stage of the power transfer—i.e. the power receiver 105 sending its identification and configuration data—the power receiver 105 waits for a predetermined interval, before it starts to direct the power transmitter 101 to adjust its coil current—i.e. by sending appropriate power control error messages. The power transmitter 101 of the wake-up light charger will recognize the query contained in the identification data for the power receiver 105, and will adjust its coil current to reflect the defined modifications to the responses to the power control error messages. Legacy power transmitters will not recognize the query, and will change the coil current in accordance with the received power control error messages. This enables the sleeve to recognize the charger type, i.e. the power receiver 105 can detect that the power transmitter 101 is sufficiently advanced to use bidirectional communication. The sleeve may communicate this information to the smartphone.

The query represented by the identification data could be as simple as a specific string—e.g. manufacturer code plus model number—but could also contain information on how the power transmitter 101 should respond to power control error messages.

Example 2

This example uses similar devices as example 1 except that the power receiver 105 is comprised directly in the smartphone. In the example, applications (apps) running on the smartphone can interact with the wireless charging functionality. In this second example, the device identification data is not used to carry the query. However, it is possible for the app running on the smartphone to send a query contained in a Proprietary Packet, i.e. the query message is in the form of a Proprietary Packet. As in the previous example, this query could direct the wake-up light charger to insert a specific modification to processing of power control error messages by the power transmitter 101. Specifically, the query can contain directions on how the power transmitter 101 should interpret the next few power control error messages in a different way—e.g. reverse the sign of the next two power control error messages. An advantage of using Proprietary Packets is that the app can send multiple queries to the power transmitter 101.

Example 3

In this example, a power receiver 105 seeks to determine whether it is coupled to a power transmitter 101 compliant with a revision/version of the standard which is higher or equal to that of the power receiver 105. In this example, the power transmitter 101 can interpret the version number sent by the power receiver 105 in the initial stage of the power transfer, i.e. the standards version reference forms the query. At the start of the power transfer phase, a power transmitter 101 matching the version, or which complies with a newer version, can insert a signature modification pattern to the responses to the power control error messages, i.e. it can change the coil current in a different way at the start of the power transfer phase. A particular advantage of this approach is that it provides a work-around for the issue of reserved packets being used incorrectly in legacy equipment (and specifically the problem that legacy power transmitters may terminate a power transfer phase if a reserved packet is received). Once a power receiver has detected that the power transmitter complies with the same or a newer version, it can start to use messages that were reserved in the earlier revision of the standard.

In some embodiments, the power receiver 105 may modify the way the transmitted power control error messages are determined when a potentially modified response is expected. For example, following a query message, the power receiver 105 may proceed to provide, say, two power control error messages requesting increased power even if the power level is currently at the desired level. If a positive response is indicated by two power control error messages being ignored, the power receiver 105 can detect a positive response by the power level remaining constant. However, if two step changes in power are detected, a negative response is determined by the power receiver 105. The power receiver 105 may then revert to normal power control operation, which may typically result in the next two power control error messages requesting a reduction in power level thereby returning the power signal to the desired power level.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A wireless power transmitter, the wireless power transmitter comprising:
   a message receiver circuit, wherein the message receiver circuit receives data messages from a wireless power receiver,
      wherein the data messages are communicated by load modulation of a wireless power signal;
      wherein the data messages comprise at least one power control message and at least one query message, and wherein the at least one query message comprises a request for information regarding capabilities of the wireless power transmitter;
   a power loop controller circuit,
      wherein the power loop controller circuit operates in at least two modes;
         wherein, in a first mode, if a value of the power control message is a first value, then the power loop controller circuit increases a magnitude of the wireless power signal,
         wherein, in the first mode, if the value of the power control message is a second value, then the power loop controller circuit decreases the magnitude of the wireless power signal,
      wherein, in a second mode, if the value of the power control message is the first value, then the power loop controller circuit does not increase the magnitude of the wireless power signal,
      wherein, in the second mode, if the value of the power control message is the second value, then the power loop controller circuit does not decrease the magnitude of the wireless power signal; and
   a modification processor circuit, wherein, in response to a received query message, the modification processor circuit is configured to cause the power loop controller circuit to enter the second mode to communicate a response to the at least one query message.

2. The wireless power transmitter of claim 1,
   wherein in the second mode, if the value of the power control message is the first value, then the power loop controller circuit decreases the magnitude of the wireless power signal,
   wherein in the second mode, if the value of the power control message is the second value, then the power loop controller circuit increases the magnitude of the wireless power signal.

3. The wireless power transmitter of claim 1, wherein in the second mode, the power loop controller circuit modifies the wireless power signal in accordance with a first pattern of modifications provided by the modification processor circuit.

4. The wireless power transmitter of claim 3,
   wherein the modification processor circuit selects the first pattern from a plurality of patterns of modifications in response to the at least one query message,
   wherein each pattern of the plurality of patterns corresponds to a different response to the at least one query message.

5. The wireless power transmitter of claim 1, wherein the at least one query message comprises an indication of a desired modification of the magnitude of the wireless power signal in the second mode.

6. The wireless power transmitter of claim 1, wherein the power loop controller circuit modifies the magnitude of the wireless power signal by changing an inductor current.

7. The wireless power transmitter of claim 1,
   wherein the at least one query message comprises a device identification,
   wherein the power loop controller circuit modifies the magnitude of the wireless power signal based on the device identification.

8. The wireless power transmitter of claim 1,
   wherein the at least one query message comprises an indication of a technical specification with which the wireless power receiver complies,
   wherein in the second mode, the power loop controller circuit modifies the magnitude of the wireless power signal based on the indication of the technical specification.

9. The wireless power transmitter of claim 1, wherein the at least one query message is included in a configuration message transmitted prior to initialization of a power transfer phase.

10. The wireless power transmitter of claim 1, wherein the power loop controller circuit modifies the wireless the power signal based on a capability of the wireless power transmitter.

11. The wireless power transmitter of claim 1,
   wherein the received query corresponds to an inquiry of whether the wireless power transmitter has a particular feature;

wherein the modification processor circuit determines the response to the received query based on available features of the wireless power transmitter, wherein, if the wireless power transmitter has the particular feature, the modification processor circuit places the power loop controller circuit in the second mode, wherein if the wireless power transmitter does not have the particular feature, the modification processor circuit maintains the power loop controller circuit in the first mode.

12. A power transfer system comprising the wireless power transmitter according to claim 1.

13. A power receiver for receiving power from a wireless power transmitter during a power transfer phase, the power receiver comprising:
- an inductor, wherein the inductor receives a wireless power signal;
- a transmitter, wherein the transmitter transmits data messages to the wireless power transmitter, wherein the data messages are communicated by load modulation of the wireless power signal;
- a query message processor circuit, wherein the query message processor circuit transmits a query message to the wireless power transmitter, and wherein the query message comprises a request for information regarding capabilities of the wireless power transmitter;
- a power loop controller circuit, wherein the power loop controller circuit transmits power control error messages to the wireless power transmitter,
  - wherein at least one of the power control error messages request a change in a magnitude of the wireless power signal,
  - wherein a first value of the power control error message requests an increase in the magnitude of the wireless power signal,
  - wherein a second value of the power control error message requests a decrease in the magnitude of the wireless power signal;
- a power signal monitor, wherein the power signal monitor monitors changes in magnitude of the received wireless power signal; and
- a response processor circuit, wherein the response processor circuit determines a response to the query message based on whether a detected change in the magnitude of the received wireless power signal is consistent with the requested change represented by the value of the power control error message.

14. A power transfer system comprising the wireless power receiver according to claim 13.

15. A method of operation for a wireless power transmitter configured to transfer power to a wireless power receiver during a power transfer phase using a wireless power signal, the method comprising:
- receiving data messages from the wireless power receiver,
  - wherein the data messages are communicated by load modulation of the wireless power signal,
  - wherein the data messages comprise at least one power control message,
  - wherein the data messages comprise at least one query message wherein the at least one query message comprises a request for information regarding capabilities of the wireless power transmitter;
- controlling a magnitude of the wireless power signal,
  - wherein, in a first mode, if a value of the power control message is a first value, then the power loop controller circuit increases the magnitude of the wireless power signal,
  - wherein, in the first mode, if the value of the power control message is a second value, then the power loop controller circuit decreases the magnitude of the wireless power signal,
  - wherein, in a second mode, if the value of the power control message is the first value, then the power loop controller circuit does not increase the magnitude of the wireless power signal,
  - wherein, in the second mode, if the value of the power control message is the second value, the power loop controller circuit does not decrease the magnitude of the wireless power signal;
- detecting that the at least one query message has been received from the power receiver; and
- changing the mode of the power controller to the second mode in response to the at least one query message in order to communicate a response to the at least one query message.

16. The method of claim 15,
wherein in the second mode if a value of the power control message is the first value, decreasing the magnitude of the wireless power signal,
wherein in the second mode, if the value of the power control message is the second value, increasing the magnitude of the wireless power signal.

17. The method of claim 15, further comprising:
placing the wireless power transmitter in the second mode if the wireless power transmitter has a particular feature; and
placing the wireless power transmitter in the first mode if the wireless power transmitter does not have the particular feature,
wherein the received query message corresponds to asking inquiring whether the wireless power transmitter has the particular feature.

18. The method of claim 15,
wherein the at least one query message comprises a device identification,
and modifying the magnitude of the wireless power signal based on the device identification.

19. A method of operation for a power receiver configured to receive power from a power transmitter during a power transfer phase wherein the power receiver comprises an inductor, wherein the inductor is arranged to receive a wireless power signal, the method comprising:
- transmitting a query message to the power transmitter by load modulation of the wireless power signal, wherein the query message comprises a request for information regarding capabilities of the wireless power transmitter;
- transmitting power control error messages to the power transmitter by load modulation of the wireless power signal,
  - wherein at least one of the power control error messages request a change in a power of the wireless power signal,
  - wherein a first value of the power control error message requests an increase in the magnitude of the wireless power signal,
  - wherein a second value of the power control error message requests a decrease in the magnitude of the wireless power signal;
- monitoring changes in the magnitude of the received wireless power signal; and
- determining a response to the query message based on whether a detected change in the magnitude of the received wireless power signal is consistent with the requested change represented by the value of the power control error message.

20. The method of claim 19, further comprising determining that the power transmitter does not have a particular feature if the received wireless power signal is consistent with the requested change; and determining that the power transmitter has the particular feature if the received wireless power signal is not consistent with the requested change, wherein the query message corresponds to inquiring whether the power transmitter has the particular feature.

* * * * *